United States Patent
Atterberry et al.

(10) Patent No.: US 10,626,804 B2
(45) Date of Patent: Apr. 21, 2020

(54) ADAPTIVE CONTROL STRATEGY IN DUAL FUEL ENGINE

(71) Applicant: Caterpillar Inc., Peoria, IL (US)

(72) Inventors: Nathan Atterberry, Washington, IL (US); Matthew Engfehr, Dunlap, IL (US); Hua Xu, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 253 days.

(21) Appl. No.: 15/665,842

(22) Filed: Aug. 1, 2017

(65) Prior Publication Data

US 2019/0040804 A1 Feb. 7, 2019

(51) Int. Cl.
| | |
|---|---|
| *F02D 19/06* | (2006.01) |
| *F02D 19/08* | (2006.01) |
| *F02D 35/02* | (2006.01) |
| *F02D 19/10* | (2006.01) |
| *F02D 41/24* | (2006.01) |
| *F02D 41/00* | (2006.01) |
| *F02D 41/14* | (2006.01) |

(52) U.S. Cl.
CPC ....... *F02D 19/061* (2013.01); *F02D 19/0642* (2013.01); *F02D 19/081* (2013.01); *F02D 19/10* (2013.01); *F02D 19/105* (2013.01); *F02D 35/023* (2013.01); *F02D 41/0025* (2013.01); *F02D 41/0027* (2013.01); *F02D 41/1497* (2013.01); *F02D 41/2451* (2013.01); *F02D 2200/02* (2013.01); *F02D 2200/0612* (2013.01); *F02D 2200/10* (2013.01)

(58) Field of Classification Search
CPC ............ F02D 19/0641; F02D 19/0642; F02D 19/081; F02D 35/0236; F02D 19/10; F02D 41/0027
See application file for complete search history.

(56) References Cited

U.S. PATENT DOCUMENTS

| | | |
|---|---|---|
| 7,266,439 B2 | 9/2007 | Wang et al. |
| 9,273,594 B2 | 3/2016 | Bandyopadhyay |
| 9,464,583 B2 | 10/2016 | Loye et al. |
| 9,556,809 B2 | 1/2017 | Klingbell |
| 9,599,040 B2 | 3/2017 | Sivasubramanian et al. |
| 2015/0252741 A1* | 9/2015 | Sixel ................... F02D 19/0642 123/472 |
| 2016/0208749 A1 | 7/2016 | Sivasubramanian et al. |
| 2017/0089273 A1* | 3/2017 | Thomas ................ F02D 19/081 |

FOREIGN PATENT DOCUMENTS

GB 2531024 A 4/2016

* cited by examiner

*Primary Examiner* — Kevin A Lathers
(74) *Attorney, Agent, or Firm* — Brannon Sowers & Cracraft

(57) ABSTRACT

A dual fuel engine system, such as for diesel and natural gas operation, includes a control system having an electronic control unit structured to vary a stored control valve for a fuel delivery parameter, responsive to engine power output. The engine power output can be determined by in-cylinder pressure monitoring during a liquid fuel mode. The stored control value can be a dynamically updated value in an engine fueling map.

19 Claims, 3 Drawing Sheets

ADAPTIVE CONTROL STRATEGY IN DUAL FUEL ENGINE

TECHNICAL FIELD

The present disclosure relates generally to fueling control in a dual fuel engine system, and more particularly to controlling fueling amounts to minimize differences in performance between a liquid fuel mode and a mixed liquid and gaseous fuel mode.

BACKGROUND

Internal combustion engines are well known and widely used for propulsive power, electric power generation, gas compression, liquid transfer, in various industrial applications, for example. In a conventional four-cycle or two-cycle engine operating scheme, a mixture of fuel and air is combusted within an engine cylinder to produce a rapid pressure rise and induce linear travel of a piston, ultimately rotating a crankshaft to provide torque for various purposes. Spark-ignited engines typically employ a liquid petroleum distillate fuel such as gasoline or various gaseous fuels in the nature of natural gas, methane, propane, and various mixtures such as biogas, landfill gas, and mine gas. Compression-ignition engines typically utilize fuels such as distillate diesel fuel, biodiesel, and still other liquid fuels. The manner in which various components of an engine such as valves, pumps, cams, actuators, and still others are constructed and operated can depend to a significant degree upon the type of fuel that is expected to be utilized. Likewise, typical or optimal operating conditions and suitability to particular duty cycles can be closely associated with fuel type.

For example, spark-ignited engines commonly operate at relatively lower cylinder pressures with ignition timing determined by a timing of production of a spark. Compression ignition engines, in contrast, tend to operate at relatively higher cylinder pressures to enable autoignition, with a timing of ignition generally dependent upon when autoignition thresholds are obtained. In-cylinder temperatures and pressures tend to be higher in compression ignition engines than in spark-ignited engines. The manner by which engine emissions are treated also varies across different engine types and fueling platforms. In recent years, there has been significant interest in development of engines and operating strategies that are flexible with regard to fuel utilization. Fuel prices can be fairly dynamic. Moreover, certain fuels that have realized relatively increased abundance in recent years, such as natural gas, can have desirable combustion or emissions properties which are sought to be exploited.

One type of engine design that allows for operation with different fuel types combines diesel fuel and natural gas. Diesel alone is relatively easy to compression ignite, but can produce undesired emissions. When natural gas is used as a fuel in a diesel engine, without modification the mixture of natural gas and air would likely fail to ignite, knock, or have combustion stability problems. Engineers have developed various strategies for predominantly burning natural gas while using a relatively smaller amount of diesel fuel as a so-called pilot fuel. As the mixture of air, natural gas, and diesel pilot fuel is compressed, the diesel pilot fuel can ignite, which in turn ignites the natural gas. Such designs can offer combined advantages of both fuel types. One example of such an engine is known from U.S. Pat. No. 6,032,617 to Willi et al.

SUMMARY OF THE INVENTION

In one aspect, a dual fuel engine system includes an internal combustion engine having an engine housing with a cylinder formed therein, and a dual fuel system having an electrically actuated liquid fuel admission valve to deliver a liquid fuel to the cylinder, and an electrically actuated gaseous fuel admission valve to deliver a gaseous fuel to the cylinder. The dual fuel engine system further includes an electronic control unit in control communication with each of the electrically actuated liquid fuel admission valve and the electrically actuated gaseous fuel admission valve to operate the internal combustion engine in either of a liquid fuel mode or a mixed liquid and gaseous fuel mode. The electronic control unit is structured to receive data indicative of an engine power output produced in response to combustion of the liquid fuel within the cylinder, and to vary a stored control value for a fuel delivery parameter responsive to the data. The engine power output includes an engine power output produced during operating the internal combustion engine in the liquid fuel mode, and the electronic control unit is further structured to produce a gaseous fuel delivery command that is based on the stored control value varied responsive to the data, during operating the internal combustion engine in the mixed liquid and gaseous fuel mode.

In another aspect, a method of operating a dual fuel engine system includes delivering liquid fuel into a cylinder in an internal combustion engine during operating the internal combustion engine in a liquid fuel mode. The method further includes receiving data indicative of an engine power output that is produced in response to combustion of the liquid fuel within the cylinder, and varying a stored control value for a fuel delivery parameter in the internal combustion engine in a manner that is responsive to the data. The method further includes delivering liquid fuel and gaseous fuel into the cylinder in the internal combustion engine during operating the internal combustion engine in a mixed liquid and gaseous fuel mode, and metering the gaseous fuel delivered into the cylinder during the operating of the internal combustion engine in the mixed liquid and gaseous fuel mode based on the stored control value.

In still another aspect, a control system for a duel fuel engine system includes a sensing mechanism structured to produce data indicative of an engine power output produced in response to combustion of a liquid fuel in a cylinder in an internal combustion engine in the dual fuel engine system. The control system further includes an electronic control unit structured to output fueling control commands to an electrically actuated liquid fuel admission valve or an electrically actuated gaseous fuel admission valve to operate the internal combustion engine in either a liquid fuel mode or a mixed liquid and gaseous fuel mode, and further structured to produce the fueling control commands based on a stored control value for a fuel delivery parameter. The electronic control unit is coupled with the sensing mechanism and further structured to reduce a performance error between the liquid fuel mode and the mixed liquid and gaseous fuel mode at least in part by varying the stored control value responsive to the data indicative of an engine power output.

DETAILED DESCRIPTION

Figure 1:
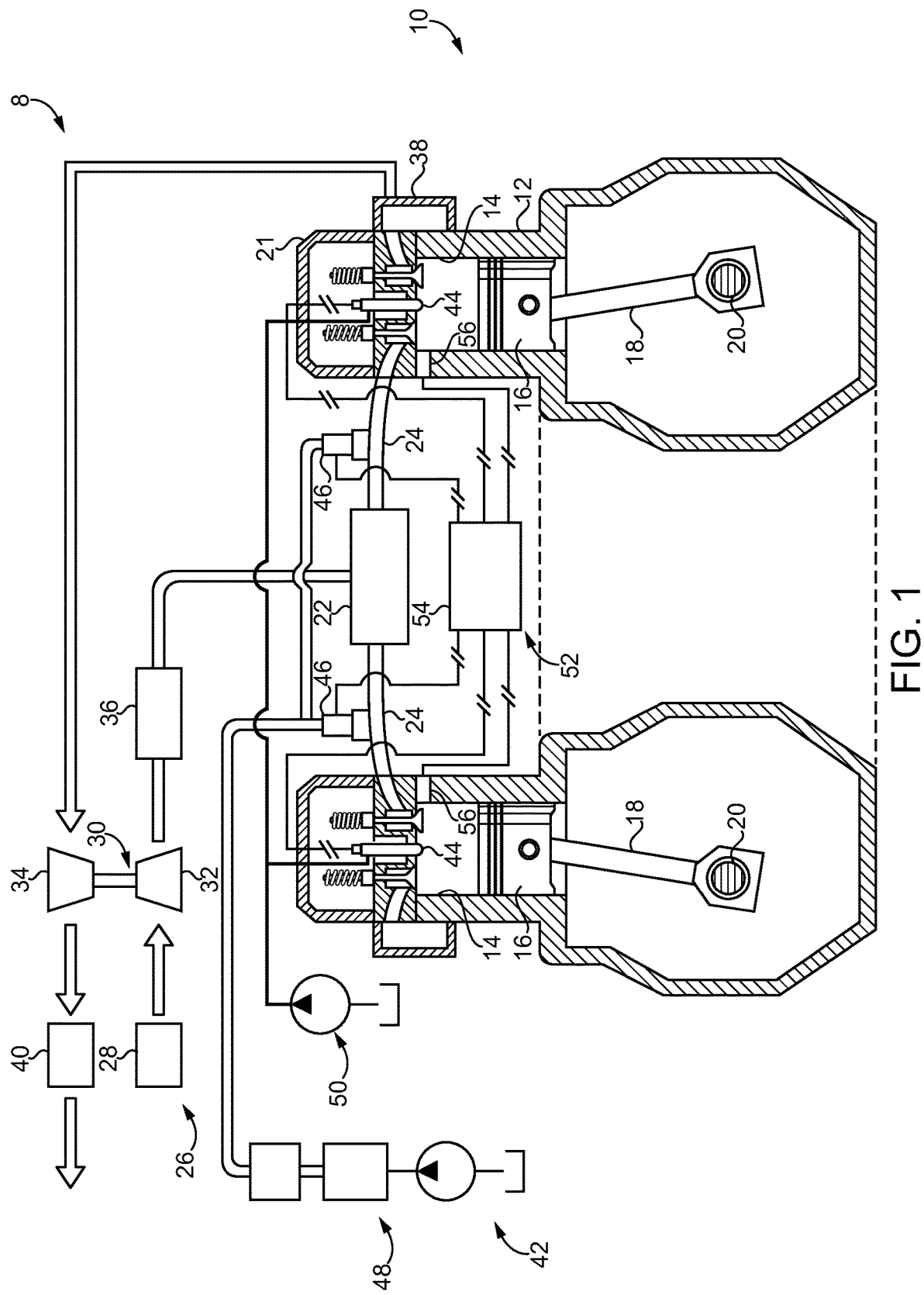
FIG. 1 is a partially sectioned diagrammatic view of a dual fuel engine system, according to one embodiment.

Referring to FIG. 1, there is shown a dual fuel engine system 8 according to one embodiment. Dual fuel engine system 8 (hereinafter "system 8") includes an internal combustion engine 10 having an engine housing 12 with a plurality of cylinders 14 formed therein. In a typical embodiment, internal combustion engine 10 (hereinafter "engine 10") is a multi-cylinder engine with a plurality of cylinders 14 in an in-line configuration, a V-configuration, or any other suitable configuration, and having a plurality of pistons 16 movable within cylinders 14 to increase pressure of a mixture containing a liquid fuel, air, and a gaseous fuel, or other mixtures, to an autoignition threshold. Each of pistons 16 is coupled by way of a connecting rod 18 to a crankshaft 20 in a generally conventional manner. The present description refers at various points to a single cylinder and components and operation associated with a single cylinder, however, it should be appreciated that the description of any component in the singular should be understood to refer by way of analogy to other similar or identical components in system 8 in a multi-cylinder design. As will be further apparent from the following description, system 8 is configured such that operation in a liquid fuel mode, which can include a liquid fuel only mode, and operation in a mixed liquid and gaseous fuel mode, are equivalent in terms of performance. In other words, whatever performance is demanded of system 8 by an operator can be expected to be produced regardless of the specific fueling strategy in place at that time.

Engine 10 further includes an engine head 21 coupled to engine housing 12 in a generally conventional manner. An intake valve 23 and an exhaust valve 25, or multiple ones of these, may be positioned at least partially within engine head 21 and movable to enable gas exchange with cylinder 14 in a generally conventional manner. An air system 26 supplies intake air by way of an air inlet 28 to an intake manifold 22. A turbocharger 30 includes a compressor 32 positioned fluidly between air inlet 28 and intake manifold 22, as is an aftercooler 36 in the illustrated embodiment. Intake runners 24 are provided to fluidly connect intake manifold 22 to each cylinder 14. An exhaust manifold 38 is fluidly connected to each cylinder 14 and conveys a stream of exhaust gases to turbine 34 of turbocharger 30 and thenceforth to an aftertreatment element 40.

System 8 further includes a dual fuel system 42 coupled with engine 10 and including an electrically actuated liquid fuel admission valve 44 to deliver a liquid fuel to cylinder 14. In a practical implementation strategy, liquid fuel admission valve 44 could include or be a part of a fuel injector positioned at least partially within cylinder 14. Rather than a direct injection strategy, dual fuel system 42 could be configured for port injection, or still another delivery strategy for liquid fuel. Liquid fuel supply equipment 50 is also part of dual fuel system 42, and can include one or more pumps, liquid fuel tanks, conduits, and still other components. Dual fuel system 42 could include a common fuel rail containing pressurized liquid fuel that is fed at an injection pressure to each of a plurality of liquid fuel admission valves 44, however, in other embodiments the liquid fuel could be pressurized within each fuel injector by way of hydraulic pressurization, a cam-actuated unit pump, or any other suitable arrangement.

Dual fuel system 42 further includes an electrically actuated gaseous fuel admission valve 46 to deliver a gaseous fuel to cylinder 14. In the illustrated embodiment, gaseous fuel admission valve 46 is in fluid communication with intake runner 24, for each cylinder 14. In other embodiments, gaseous fuel could be delivered by way of injection directly into cylinder 14, delivered at a location upstream compressor 32, or injected into intake manifold 22, for example. Dual fuel system 42 further includes gaseous fuel supply equipment 48, which could include a stored supply of pressurized gaseous fuel or cryogenically stored gaseous fuel in a liquid state, pumps, a vaporizer, a pump for pressurization, and various other valves, conduits, and other known equipment. It should be appreciated that dual fuel system 42 can include components provided as add-on components to engine system 8 where system 8 is configured as a diesel engine platform. In other words, at least some of the components of dual fuel system 42 are designed to adapt a known diesel engine to a known dual fuel application. In other instances, system 10 could be built from the ground up for dual fuel applications.

System 8 further includes a control system 52 for controlling delivery and apportioning of liquid fuel and gaseous fuel, and potentially other aspects of engine operation. Control system 52 includes an electronic control unit 54 which is in control communication with each of liquid fuel admission valve 44 and gaseous fuel admission valve 46 to operate engine 10 in either of a liquid fuel mode or a mixed liquid and gaseous fuel mode. It is contemplated that engine 10 might be operated at any of a variety of different combinations of liquid fuel and gaseous fuel, in other words a range of gaseous fuel substitution rates. In one implementation, system 8 is configured to operate at either 100 percent liquid fuel in a liquid fuel mode, or at approximately 20 percent liquid fuel to 80 percent gaseous fuel in a mixed liquid and gaseous fuel mode. Those skilled in the art will of course appreciate that a 50 percent liquid to 50 percent gas mode, a predominantly liquid mode, and various other combinations could fall within the scope of the present disclosure. It is contemplated that injected liquid fuel, such as diesel distillate fuel, can serve as a relatively readily auto-ignitable pilot fuel that ignites the relatively larger proportion of gaseous fuel in a typical fuel charge during mixed liquid and gaseous fuel mode operation.

Electronic control unit 54 can include any suitable computerized control unit, including a microprocessor, a microcontroller, or a field programmable gate array (FPGA), for instance. The term "processor" is used herein in an illustrative sense and contemplates any suitable digital computing device. Control system 52 also includes a sensing mechanism 56 structured to produce data indicative of an engine power output produced in response to combustion of a liquid fuel in cylinder 14. Sensing mechanism 56 can include a pressure sensor including a pressure-sensitive component and/or material exposed to a fluid pressure of cylinder 14. In the illustrated embodiment sensing mechanism 56 is mounted within engine housing 12, however, it will of course be appreciated that sensing mechanism could be mounted elsewhere such as in engine head 21. It has been observed that cylinder pressure, and in particular cylinder pressure over the course of at least a portion of an engine cycle is indicative of a power produced within the subject engine cylinder. Accordingly, by monitoring cylinder pressure over the course of at least a portion of an engine cycle, such as 180 crank angle degrees, 360 crank angle degrees, or 720 crank angle degrees for a full four-stroke engine cycle, can provide an indication of engine power output. As will be further apparent from the following description, electronic control unit 54 is structured to exploit this ability to monitor engine power output to reduce a performance error between liquid fuel mode and mixed liquid and gaseous fuel mode.

Those skilled in the art will appreciate that energy content of different liquid fuel blends, such as winter diesel versus summer diesel, can vary up to several percentage points. The generated torque of a reciprocating internal combustion compression ignition dual fuel engine, which relates to power output, can vary as a function of gaseous fuel to liquid fuel substitution rate, intake charge temperature, intake charge density, heating value of the gaseous fuel, and various other factors. It is desirable to produce power in response to a given operator request that is substantially the same regardless of whether an engine such as engine 8 is in liquid fuel mode or mixed liquid and gaseous fuel mode. For instance, for a given extent of depressing an accelerator pedal (in a mobile vehicle application), an operator will typically desire the engine to respond the same regardless of the fueling mode.

It is contemplated that a practical application of system 8 will be for mobile vehicle applications such as off-highway mining trucks, frac rigs, and still others. A performance error in such applications could be understood as a difference between a desired response of a machine incorporating system 8 and an observed response. The desired response and the observed response could be acceleration, rim pull, output torque, engine speed, or still another performance variable. Performance error mitigation for behavior perceptible to an operator is a practical implementation of the present disclosure. As further discussed herein, electronic control unit 54 can gather data during operating system 8/engine 10 in the liquid fuel mode and apply those observations and data to operation in the mixed liquid and gaseous fuel mode such that performance in the two modes is indistinguishable, and transitioning between the two modes is transparent to the operator.

Figure 2:
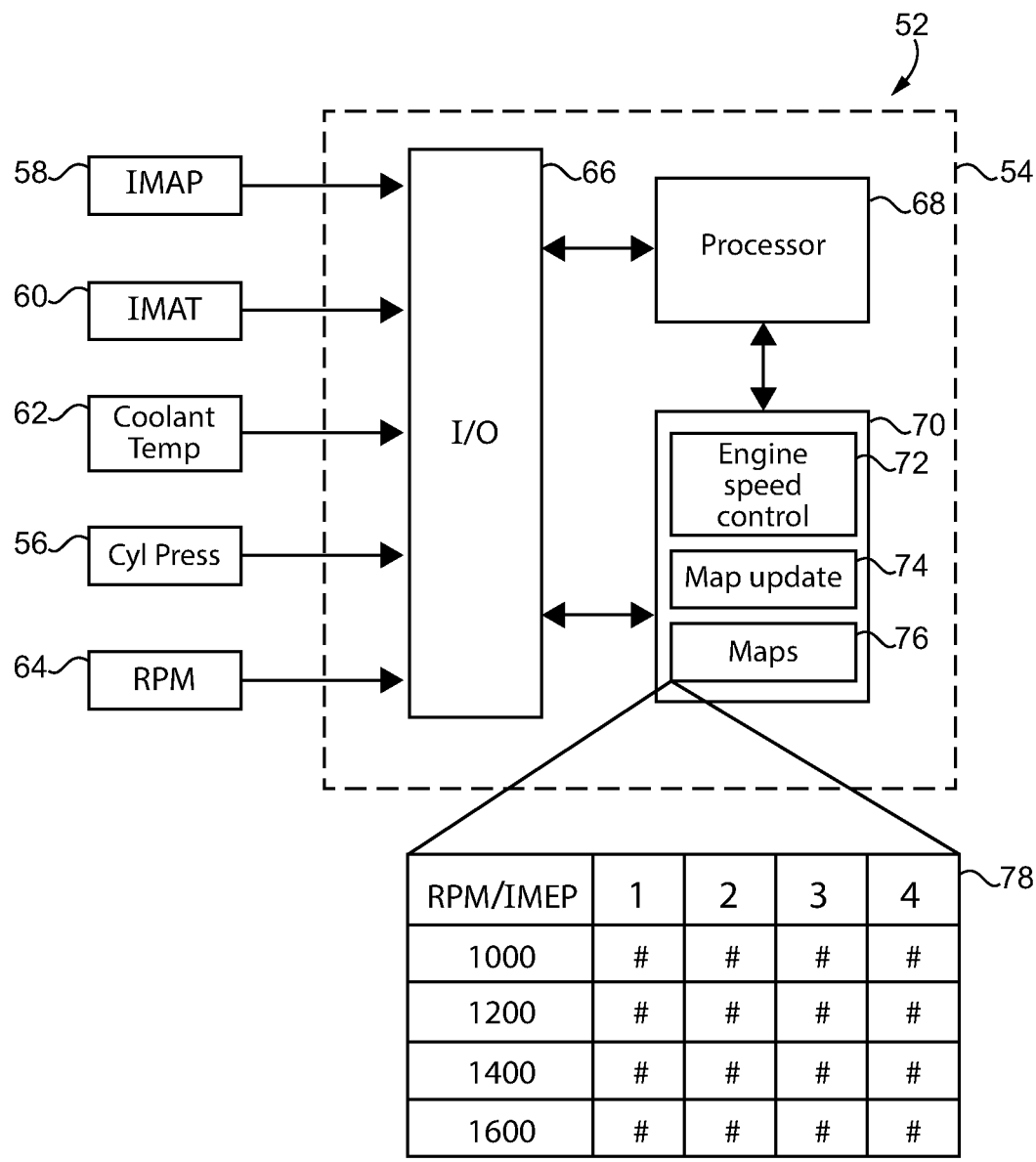
FIG. 2 is a block diagram of control system elements, according to one embodiment.

Referring also now to FIG. 2, there is shown electronic control unit 54 in control system 52 and illustrating features in additional detail. Electronic control unit 54 can include a processor 68 as suggested above, coupled with a machine readable memory 70 and an input/output or I/O interface 66. Machine readable memory 70 can include any suitable memory such as RAM, ROM, DRAM, SDRAM, FLASH, a hard drive, or any other suitable known memory type. Memory 70 stores several pieces of software including machine readable code to be executed by processor 68, namely, an engine speed control 72, a map update 74, and one or more engine fueling maps 76. A detailed enlargement in FIG. 2 includes one engine fueling map 78 that includes an engine speed or RPM axis with example engine speeds, and an engine power or indicated mean effective pressure (IMEP) axis. A plurality of map locations are defined and each shown with a # in engine fueling map 78 and represents a control value for a fueling parameter. The control values can include a total governed fueling amount, although alternatives are contemplated where the fueling map control values are associated with a different fueling parameter. In other embodiments, engine fueling map 78 could include additional axes, such as an intake manifold temperature axis, an air/fuel ratio axis, or still others. As further discussed herein, varying of the control values in map 78 in real time based upon engine power output enables a reduction in performance errors between liquid fuel and mixed liquid and gaseous fuel modes.

In an implementation, electronic control unit 54 is structured to receive data indicative of an engine power output produced in response to combustion of liquid fuel within cylinder 14, and to vary a stored control value for a fuel delivery parameter responsive to the data indicative of an engine power output. As noted above, the data indicative of engine power output can include fluid pressure data produced by a pressure sensor, sensing mechanism 56, exposed to a fluid pressure of cylinder 14. Electronic control unit 54 may be further structured to calculate a mean effective pressure in cylinder 14 based on the fluid pressure data, and to vary the stored control value based on the mean effective pressure in the cylinder. Those skilled in the art will also appreciate that other strategies for determining or approximating engine power output could be used. The engine power output of interest may include engine power output produced during operating engine 10 in the liquid fuel mode. Electronic control unit 54 may be further structured to produce a gaseous fuel delivery command that is based on the stored control value varied responsive to the data indicative of engine power output, during operating engine 10 in the mixed liquid and gaseous fuel mode. It will therefore be appreciated that data as to engine power output is gathered in the liquid mode, and then exploited in the mixed mode to reduce performance errors. In liquid mode, for a known liquid fuel quantity such as diesel, power output of an internal combustion engine is relatively well understood. In mixed liquid and gaseous fuel mode, power output of the engine is relatively more complicated, at least for the reasons that heating value of gaseous fuel can vary fairly drastically from fuel source to fuel source, and combustion of the fuel mix can vary relatively significantly depending on boundary conditions such as intake manifold air temperature, air/fuel ratio, engine load, and others. By determining power output from combustion of liquid fuel only, gaseous fuel delivery can be metered in a manner that provides relatively greater engine speed control accuracy, or greater accuracy using another control parameter such as engine torque, than what might otherwise be obtained without the adaptive varying of control values as set forth herein.

INDUSTRIAL APPLICABILITY

In many applications, a dual fuel engine will operate in a mixed mode most of the time. There are various instances, however, where a machine powered by a dual fuel engine can be expected to transition to or operate in a liquid fuel mode. For example, during startup it is typical to operate in liquid fuel-only mode at least initially and liquid fuel-only mode can be artificially prolonged to enable data gathering. In other instances, machines may not be operated in a manner where liquid fuel-only mode is routinely activated, and in such instances liquid fuel mode could be forced. In either case, electronic control unit 54 may be structured to determine suitability of engine 10 and system 8 generally to fueling map recalibration when liquid mode operation is detected.

In FIG. 2 an intake manifold air pressure or IMAP sensor 58 is shown, as are an intake manifold air temperature or IMAT sensor 60, and a coolant temp sensor 62. Each of sensors 58, 60, 62, and potentially still others can provide signals to electronic control unit 54 that enable determining whether attempted fueling map recalibration is appropriate. In one embodiment, processor 68 can receive signals from sensors 58, 60, 62, and potentially still others and responsively produce a fueling map recalibration suitability signal.

Figure 3:
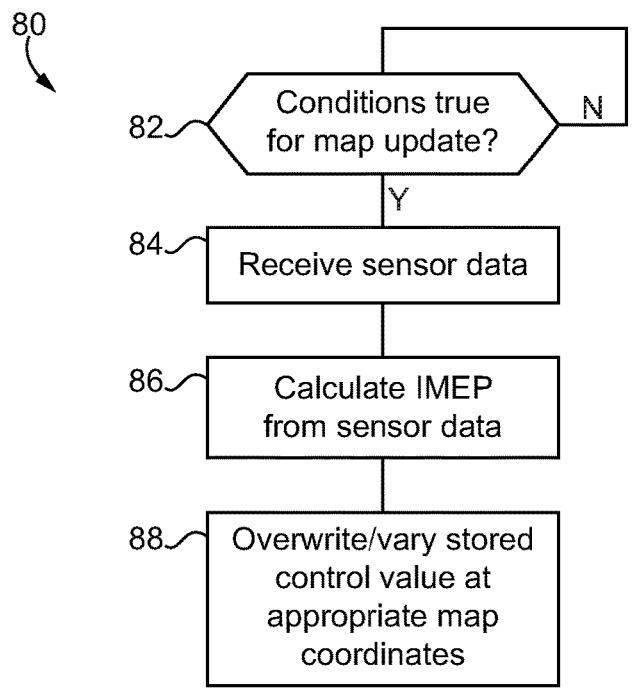
FIG. 3 is a flowchart illustrating example control logic flow, according to one embodiment.

Referring also now to FIG. 3, there is shown a flowchart 80 illustrating example control logic flow along these lines. Flowchart 80 could be understood to represent steps performed by processor 68 when executing map update 74. At block 82, the logic can query are conditions true for map update? The determination at block 82 could include determining whether gas substitution=0 to confirm liquid fuel mode is being used. Also at block 82 the logic could query is intake manifold temperature within high and low limits and/or is intake manifold pressure within high and low limits? At block 82 it could also be determined whether jacket water temperature is within high and low limits, and whether liquid fuel delivery is above a minimum threshold to ensure fuel delivery is stable. Other conditions that must be true for map update to proceed could include whether cylinder cutout is inactive, and whether average IMEP is changing no faster than some predetermined limit, helping ensure that load is constant or relatively constant for at least a few engine cycles. It might also be determined at block 82 that no active diagnostics are run on any relevant sensor, such as sensing mechanism 56. If all conditions are true for map update at block 82, the logic can advance to block 84 to receive sensor data. If all conditions are not true, the logic can return to again execute block 82 or associated steps of determining suitability, or could exit.

At block 84 the receipt of sensor data can include receiving pressure signals from sensing mechanism 56, and the logic can advance to block 86 to calculate IMEP from the sensor data. Implicit in the calculation at block 86 can be consideration of engine timing or crank angle to define a number of engine cycles, such as 3, 4, 5, or another number of partial or complete engine cycles needed to acquire sufficiently reliable mean effective pressure. From block 86, the logic can advance to block 88 to overwrite/vary a stored control value at appropriate map coordinates. From block 88, the logic could exit, or some other function could be executed.

From the foregoing description, it will be understood that electronic control unit 54 could be continually monitoring for conditions suitable for gathering engine power output data. It is contemplated that the logic could run continuously, intermittently, or only upon forcing engine 10 to operate in liquid fuel mode. It is further contemplated that electronic control unit 54 can vary the stored control value by way of repopulating a stored control value in engine fueling map 78, thus overwriting a previously stored control value at a location in the engine fueling map 78 that is determined by the mean effective pressure. It will be recalled that the engine fueling map 78 may have as one of its axes a mean effective pressure. Electronic control unit 54 can be understood as observing the total governed fuel amount that produces a particular mean effective pressure. That mean effective pressure is then understood to be produced by delivery of the total governed amount of fuel. Another way to understand the varying of a control value is that electronic control unit 54 is periodically recalibrating one or more engine fueling maps based on the type of fuel and the other conditions experienced by system 8 at that time. This total governed fuel amount that imparts a particular mean effective pressure can then be exploited for operation in the mixed liquid and gaseous fuel mode as stated above.

Figure 4:
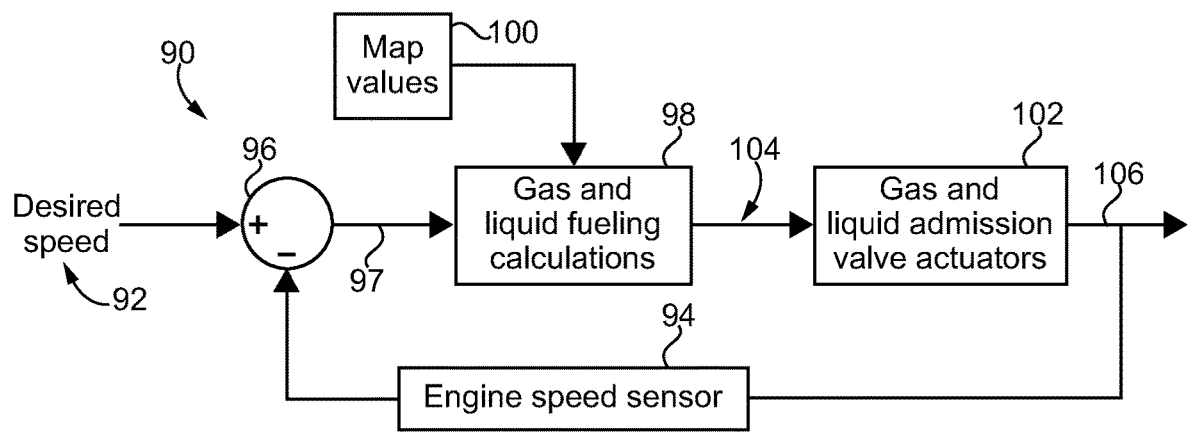
FIG. 4 is a control loop block diagram, according to one embodiment.

Referring now to FIG. 4, there is shown an engine speed control loop 90. Desired speed is shown at 92, an engine speed sensor is shown at 94, and a summer 96 produces an error signal 97 based upon a desired speed input and an observed or sensed engine speed. Error signal 97 is processed at a block 98 where gas and liquid fueling calculations are performed. Map values are shown at 100 that are inputted to the calculations at block 98. With map values that have not been recalibrated, it could be expected that the fueling calculations at block 98 will be inaccurate to the extent that an actual power output in engine 10 differs from a presumed power output used in originally populating engine fueling map 78. In other words, because the original populating of engine fueling map 78 could rely upon data that is not accurate at present, fueling calculations at block 98 could incorporate that same inaccuracy. In an implementation, such as an 80 percent gaseous fuel to 20 percent liquid fuel implementation, each time engine speed control loops, the same liquid fuel amount can be delivered based upon an apportionment of the total governed fuel amount between liquid fuel and gaseous fuel. The gaseous fuel delivery amount, and the gaseous fuel admission valve control, can change each time the engine speed control loops to adjust engine speed towards the desired speed. Gaseous fuel and liquid fuel delivery commands 104 can be outputted from block 98 and received at gas and liquid admission valve actuators 102 to deliver gaseous fuel and liquid fuel to produce an engine speed output 106.

The present description for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The invention claimed is:

1. A dual fuel engine system comprising:
    an internal combustion engine including an engine housing having a cylinder formed therein;
    a dual fuel system including an electrically actuated liquid fuel admission valve to deliver a liquid fuel to the cylinder, and an electrically actuated gaseous fuel admission valve to deliver a gaseous fuel to the cylinder; and
    an electronic control unit in control communication with each of the electrically actuated liquid fuel admission valve and the electrically actuated gaseous fuel admission valve to operate the internal combustion engine in either of a liquid fuel only mode or a mixed liquid and gaseous fuel mode;
    the electronic control unit being structured to receive data indicative of an engine power output produced in response to combustion of the liquid fuel within the cylinder, and to vary a stored control value for a fuel delivery parameter responsive to the data; and
    the engine power output including an engine power output produced during operating the internal combustion engine in the liquid fuel only mode, and the electronic control unit being further structured to produce a gaseous fuel delivery command that is based on the stored control value varied responsive to the data, during operating the internal combustion engine in the mixed liquid and gaseous fuel mode.

2. The system of claim 1 wherein the data indicative of an engine power output includes fluid pressure data produced by a pressure sensor exposed to a fluid pressure of the cylinder.

3. The system of claim 2 wherein the electronic control unit is further structured to calculate a mean effective pressure in the cylinder based on the fluid pressure data, and to vary the stored control value based on the mean effective pressure in the cylinder.

4. The system of claim 1 wherein the fuel delivery parameter is a total governed fuel amount in a fueling map stored in a memory.

5. The system of claim 4 wherein the electronic control unit is further structured to apportion the total governed fuel amount between the liquid fuel and the gaseous fuel in the mixed liquid and gaseous fuel mode, and to produce the gaseous fuel delivery command based on an apportionment of the total governed fuel amount to the gaseous fuel.

6. The system of claim 1 further comprising:
an intake manifold temperature sensor;
an intake manifold pressure sensor;
a coolant temperature sensor;
wherein the electronic control unit is further structured to:
receive signals from each of the intake manifold temperature sensor, the intake manifold pressure sensor, and the coolant temperature sensor; and
determine suitability of the internal combustion engine to fueling map recalibration during operating the internal combustion engine in the liquid fuel mode based on the signals received from each of the intake manifold temperature sensor, the intake manifold pressure sensor, and the coolant temperature sensor, and
vary the stored control value by repopulating an engine fueling map responsive to determining suitability of the internal combustion engine to fueling map recalibration.

7. The system of claim 1 wherein the cylinder is one of a plurality of cylinders formed in the engine housing, and further comprising a plurality of pistons movable within the plurality of cylinders to increase pressure of a mixture containing the liquid fuel, air, and the gaseous fuel within the plurality of cylinders to an autoignition threshold.

8. The system of claim 1 wherein the dual fuel system further includes a liquid fuel injector having the electrically actuated liquid fuel admission valve therein and positioned at least partially within the cylinder, and an intake conduit in fluid communication with the cylinder, and wherein the electrically actuated gaseous fuel admission valve is in fluid communication with the intake conduit.

9. A method of operating a dual fuel engine system comprising:
delivering liquid fuel into a cylinder in an internal combustion engine during operating the internal combustion engine in a liquid fuel only mode;
receiving data indicative of an engine power output that is produced in response to combustion of the liquid fuel within the cylinder;
varying a stored control value for a fuel delivery parameter in the internal combustion engine in a manner that is responsive to the data;
delivering liquid fuel and gaseous fuel into the cylinder in the internal combustion engine during operating the internal combustion engine in a mixed liquid and gaseous fuel mode; and
metering the gaseous fuel delivered into the cylinder during the operating of the internal combustion engine in the mixed liquid and gaseous fuel mode based on the stored control value.

10. The method of claim 9 further comprising compression igniting a mixture of the liquid fuel and the gaseous fuel in the mixed liquid and gaseous fuel mode.

11. The method of claim 10 wherein the fuel delivery parameter includes a total governed fuel amount in an engine fueling map.

12. The method of claim 11 wherein the varying of the stored control value includes repopulating a stored control value in an engine fueling map.

13. The method of claim 12 wherein the receiving of the data includes receiving data produced by a pressure sensor exposed to a fluid pressure of the cylinder.

14. The method of claim 13 further comprising calculating a mean effective pressure in the cylinder based on the data produced by the pressure sensor.

15. The method of claim 14 wherein the varying of the stored control value further includes overwriting a previously stored control value at a location in the fueling map determined by the mean effective pressure.

16. A control system for a dual fuel engine system comprising:
a sensing mechanism structured to produce data indicative of an engine power output produced in response to combustion of a liquid fuel in a cylinder in an internal combustion engine in the dual fuel engine system;
an electronic control unit structured to output fueling control commands to an electrically actuated liquid fuel admission valve or an electrically actuated gaseous fuel admission valve to operate the internal combustion engine in either a liquid fuel only mode or a mixed liquid and gaseous fuel mode, and further structured to produce the fueling control commands based on a stored control value for a fuel delivery parameter; and
the electronic control unit being coupled with the sensing mechanism and further structured to reduce a performance error between the liquid fuel only mode and the mixed liquid and gaseous fuel mode at least in part by varying the stored control value responsive to the data indicative of an engine power output.

17. The system of claim 16 wherein the fuel delivery parameter includes a total governed fuel amount.

18. The system of claim 17 wherein the electronic control unit is further structured to vary the stored control value by overwriting a previously stored control value in a fueling map.

19. The system of claim 18 wherein the sensing mechanism includes a pressure sensor, and the electronic control unit is further structured to calculate a mean effective pressure in the cylinder based on the data, and to overwrite the previously stored control value at a location in the fueling map determined by the mean effective pressure.

* * * * *